United States Patent
Chesson et al.

(10) Patent No.: US 6,766,358 B1
(45) Date of Patent: Jul. 20, 2004

(54) EXCHANGING MESSAGES BETWEEN COMPUTER SYSTEMS COMMUNICATIVELY COUPLED IN A COMPUTER SYSTEM NETWORK

(75) Inventors: Gregory L. Chesson, Palo Alto, CA (US); James T. Pinkerton, Sunnyvale, CA (US); Eric Salo, Apple Valley, MN (US)

(73) Assignee: Silicon Graphics, Inc., Mountain View, CA (US)

( * ) Notice: Subject to any disclaimer, the term of this patent is extended or adjusted under 35 U.S.C. 154(b) by 0 days.

(21) Appl. No.: 09/427,203

(22) Filed: Oct. 25, 1999

(51) Int. Cl.[7] ............................................. G06F 13/00
(52) U.S. Cl. ..................................................... 709/213
(58) Field of Search ................................ 709/200, 201, 709/202, 203, 216, 212, 206, 207, 213, 214, 215, 310, 312, 313, 217, 234; 710/56; 711/173, 107, 202; 714/100, 699, 746, 748, 749

(56) References Cited

U.S. PATENT DOCUMENTS

| | | | |
|---|---|---|---|
| 5,239,643 A | 8/1993 | Blount et al. | 395/425 |
| 5,404,478 A | 4/1995 | Arai et al. | 395/400 |
| 5,522,045 A | 5/1996 | Sandberg | 395/200.08 |
| 5,606,666 A * | 2/1997 | Grant et al. | 709/216 |
| 5,961,606 A * | 10/1999 | Talluri et al. | 709/234 |
| 6,430,598 B1 * | 8/2002 | Dorrance et al. | 714/748 |

OTHER PUBLICATIONS

Katevenis M: "Telegraphos: High–Speed Communication Architecture for Parallel and Distributed Computer Systems" Technical Report Forth–ICS, XX,XX, No. TR 123, May 1, 1994 (1994–05–01), pp. 1–39, XP002038871, p. 3, line 9–line 27; figures 2.1, 3.2; p. 20, line 1–p. 21, last line; p. 26, line 35–p. 27, line 31.

Gillett R.B.: "Memory Channel Network for PCI" IEEE Micro, US, IEEE Inc., New York, vol. 16, No. 1, Feb. 1, 1996 (1996–02–01), pp. 12–18, XP00055223 ISSN: 0272–1732, p. 14, right–hand column, line 38–p. 16, right–hand column, line 35; figures 2, 4.

* cited by examiner

*Primary Examiner*—Robert B. Harrell
(74) *Attorney, Agent, or Firm*—Baker Botts L.L.P.

(57) ABSTRACT

A method for exchanging messages between computer systems communicatively coupled in a computer system network. A message (e.g., a read or write command) is sent from a software element of a first computer system (e.g., a client computer system) to a second computer system (e.g., a server computer system). A shared memory unit is accessible by the software element of the first computer system and a software element of the second computer system. The shared memory unit of the second computer system is directly accessed, bypassing the processor of the second computer system, and the data of interest is read or written from/to the shared memory unit. In one embodiment, the method pertains to acknowledgments between software elements. A plurality of messages is sent from one software element to another software element. A count of each of the plurality of messages is maintained. An acknowledgment message acknowledging receipt of a prescribed number of the messages is written to a shared memory unit when the count reaches the prescribed number.

22 Claims, 8 Drawing Sheets

EXCHANGING MESSAGES BETWEEN COMPUTER SYSTEMS COMMUNICATIVELY COUPLED IN A COMPUTER SYSTEM NETWORK

TECHNICAL FIELD

The present invention pertains to the field of computer system architecture. More specifically, the present invention pertains to a method for using shared memory to facilitate message exchanges and data transfer in a computer system or in a network of computer systems.

BACKGROUND ART

A typical computer system utilizes a variety of software elements such as an operating system, device drivers, application programs ("applications") including computer software programs, word processors, database management systems, electronic mail, and the like, and communication programs that execute communication protocols that define the procedures to be followed when data are transmitted and received.

The software elements in a computer system, and the software elements on different computer systems, use data packets to communicate with each other and exchange information. Sending and receiving is accomplished using software processes such as applications, threads, drivers, protocol stacks, and the like. In the prior art, software is involved at both ends of any message exchange or data transmission, whether it is a one-way exchange (for example, from one computer system to another), two-way (for example, from one computer system to another and back again), and so on. For example, a source software element sends data packets to a target software element in order to issue requests and commands, such as a command to execute a particular application. In response to these requests and commands, the target software element sends an acknowledgment data packet ("acknowledgment") to the source software element to indicate that the request or command was properly received, as well as responses to the requests and commands.

The focus of this discussion of the prior art is not the data processing accomplished by the software, but rather the involvement of the software in the data/message exchanges. The problem with these kinds of exchanges (with software elements involved at each end of the exchange) is that they consume processing cycles and memory resources in the computer systems involved in the exchange. In addition, the exchanges can only be accomplished at the rate at which the software can handle the data/message.

By way of exemplifying the problems with the prior art, consider the current process for sending and receiving acknowledgments in response to requests and commands. Prior Art FIG. 1 is a diagram showing a first computer system 80*a* communicatively coupled to a second computer system 80*b* in computer system network 30. The software elements executed by computer system 80*a* are represented by application layer A 10. In a similar manner, computer system 80*b* includes application layer B 60.

One of the software elements (e.g., from application layer A 10) of computer system 80*a* transmits to computer system 80*b* a data packet (e.g., message 90) containing, for example, a command or request. Computer system 80*b* responds to message 90 in the form of acknowledgment 95. Typically, a prescribed number of messages are sent by the source software element before an acknowledgment is provided by the target software element. For example, ten (10) messages may be sent from the source software element (e.g., from application layer A 10) before an acknowledgment is required from the target software element (e.g., from application layer B 60). The source software element will not transmit any further messages until it receives an acknowledgment. After receiving an acknowledgment, the source software element transmits another 10 messages.

In the prior art, message 90 is placed in a buffer (e.g., message queue B 22) of computer system 80*b* before it is eventually forwarded to application layer B 60, and similarly acknowledgment 95 is placed in a buffer (e.g., message queue A 20) of computer system 80*a* before it is eventually forwarded to application layer A 10. When a plurality of messages and acknowledgments are sent between computer systems 80*a* and 80*b*, in particular between the software elements on these computer systems, the message queues are used to control the flow of the messages and acknowledgments to the particular software elements.

A disadvantage to the prior art is that the resources of the computer system that processes the acknowledgments (e.g., computer systems 80*a* and 80*c*) are consumed by the operations associated with adding and removing acknowledgments from the message queues. For example, the computer system needs to establish field lengths for storing the acknowledgments and then needs to write the acknowledgments to the message queue. The computer system needs to synchronize the source and target software elements. It is sometimes necessary for the computer system to copy the acknowledgment before removing it from the message queue. Also, the computer system needs to specify and move pointers. Thus, the prior art techniques for processing acknowledgments consume a computer system's processing cycles and memory resources in order to complete the required operations.

The discussion above can be readily extrapolated to the exchange of other types of messages and to data transmission in the prior art. For example, a command or request from one computer system to a second computer system is placed into a queue, and there is overhead associated with processing the exchange. The prior art techniques for message exchange and data transmission require a significant amount of processing overhead, and hence the overall performance of the computer system can be significantly reduced.

Accordingly, what is needed is a method to reduce the processing overhead associated with message exchange and data transmission. What is further needed is a method to improve the overall performance of the computer system in this regard. The present invention provides a novel solution to the above needs.

These and other objects and advantages of the present invention will become obvious to those of ordinary skill in the art after having read the following detailed description of the preferred embodiments which are illustrated in the various drawing figures.

SUMMARY OF THE INVENTION

The present invention provides a method to reduce the processing overhead associated with message exchange and data transmission, and improves the overall performance of the computer system in this regard.

The present invention pertains to a method for exchanging messages between software elements in computer systems communicatively coupled in a computer system network. A message is sent from a software element of a first computer system (e.g., a client computer system) to a second computer system (e.g., a server computer system). A shared memory unit of the second computer system is directly accessed, bypassing the processor of the second computer system. The shared memory unit is accessible by the software element of the first computer system and a software element of the second computer system. Data of interest are directly read from or written to the shared memory unit.

In one embodiment, the present invention pertains to a method for acknowledging messages between a first software element and a second software element. A plurality of messages is sent from the first software element to the second software element. A count of each of the plurality of messages sent by the first software element is maintained. A message is written from the second software element to a memory unit shared by the first software element and by the second software element when the count reaches a prescribed number. The message from the second software element acknowledges receipt of the prescribed number of messages from the first software element.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODE FOR CARRYING OUT THE INVENTION

Figure 1:
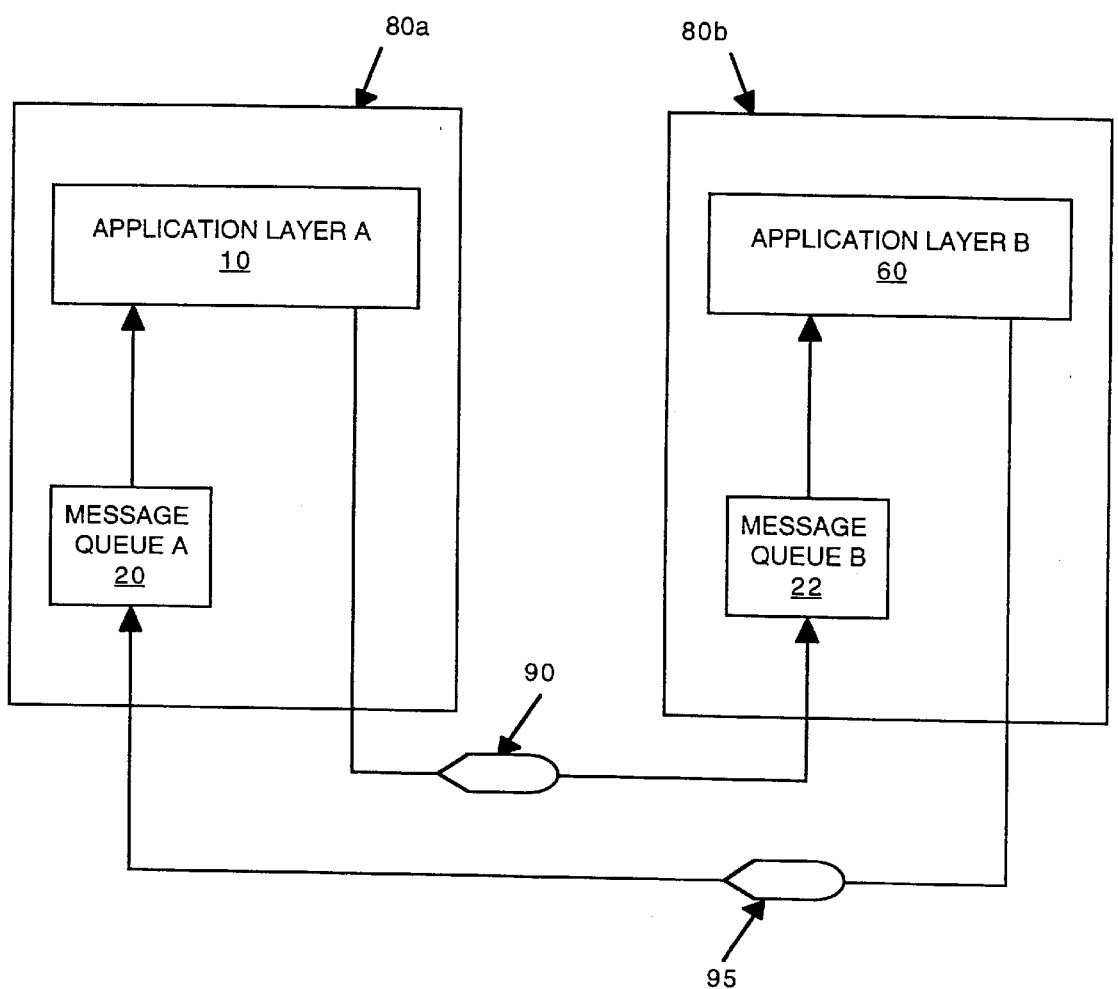
FIG. 1 is a block diagram showing software elements in prior art computer systems communicatively coupled in a computer system network.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, fragments, pixels, or the like.

As used herein, a transaction refers to the transmission or receipt of data or other such message information. The transaction may consist of all data associated with a particular computer system operation (e.g., a request or command). A transaction may also consist of a block of data associated with a particular operation; for example, a transfer of data may be broken down into several blocks of data, each block transferred prior to the transfer of a subsequent block, and each block making up a transaction.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "sending," "accessing," "maintaining," "writing," "initializing," "incrementing," or the like, refer to actions and processes of a computer system or similar electronic computing device (e.g., the processes of FIG. 6 and FIG. 7). The computer system or similar electronic computing device manipulates and transforms data represented as physical (electronic) quantities within the computer system memories, registers or other such information storage, transmission or display devices. The present invention is well suited to the use of other computer systems.

Figure 2:
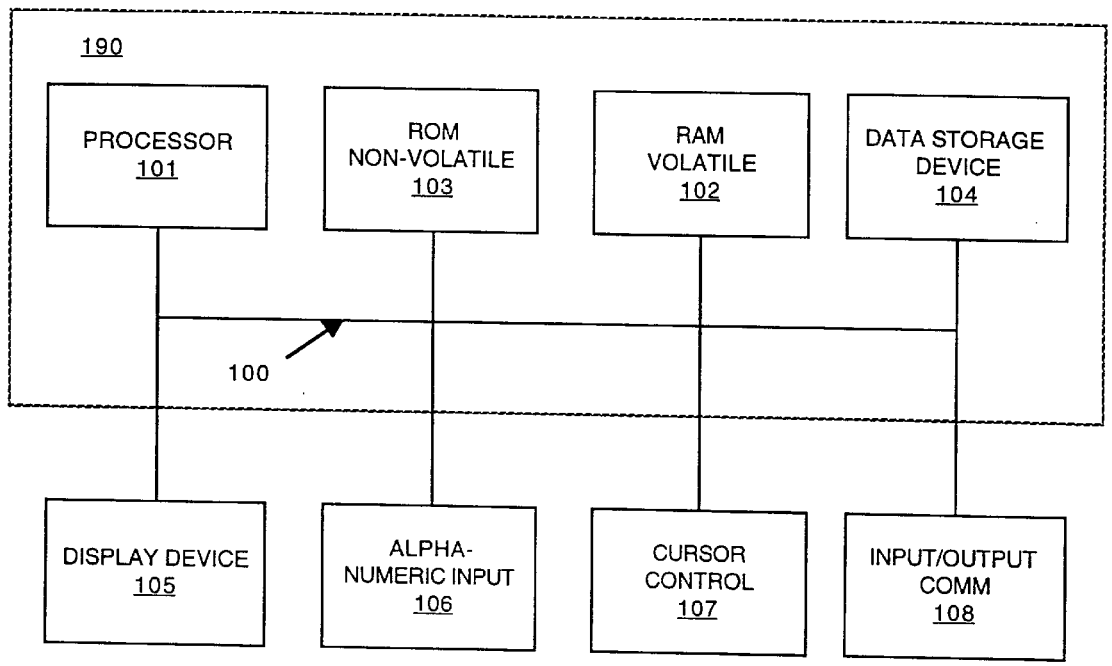
FIG. 2 is a block diagram of a general purpose computer system upon which embodiments of the present invention may be implemented.

Refer to FIG. 2 which illustrates a general purpose computer system 190 upon which embodiments of the present invention may be implemented. Computer system 190 may be one of a plurality of computer systems communicatively coupled in a network. In general, computer system 190 comprises a bus 100 for communicating information, a central processor 101 coupled with bus 100 for processing information and instructions, a random access memory 102 coupled with bus 100 for storing information and instructions for central processor 101, a read-only memory 103 coupled with bus 100 for storing static information and instructions for central processor 101, a data storage device 104 such as a magnetic or optical disk and disk drive coupled with bus 100 for storing information and instructions, a display device 105 coupled to bus 100 for displaying information to the computer user, an optional alphanumeric input device 106 including alphanumeric and function keys coupled to bus 100 for communicating information and command selections to central processor 101, an optional cursor control device 107 coupled to bus 100 for communicating user input information and command selections to central processor 101, and input/output communication device 108 (such as a network interface card) coupled to bus 100 for communicating to and from another computer system or a network.

Display device 105 utilized with computer system 190 of the present invention may be a liquid crystal device, cathode ray tube, or other display device suitable for creating graphic images and alphanumeric characters recognizable to the user. Cursor control device 107 allows the computer user to dynamically signal the two-dimensional movement of a visible symbol (pointer) on a display screen of display device 105. Many implementations of the cursor control device are known in the art including a trackball, mouse, joystick or special keys on alphanumeric input device 106 capable of signaling movement of a given direction or manner of displacement. It is to be appreciated that the cursor control device 107 also may be directed and/or activated via input from the keyboard using special keys and key sequence commands. Alternatively, the cursor may be directed and/or activated via input from a number of specially adapted cursor directing devices.

In accordance with the present embodiment of the present invention, computer system 190 executes software elements such as an operating system, device drivers, application programs ("applications") including computer software programs, word processors, database management systems, electronic mail, and the like, and communication programs that execute communication protocols that define the procedures to be followed when data are transmitted and received.

Figure 3:
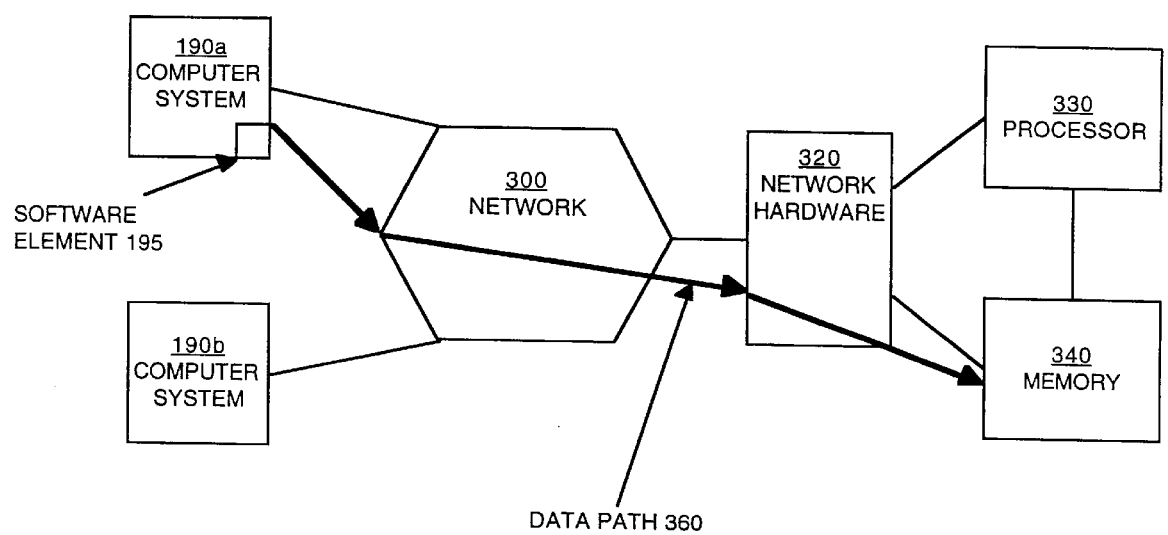
FIG. 3 is a block diagram showing the flow of data between computer systems in a computer system network in accordance with one embodiment of the present invention.

FIG. 3 illustrates the flow of data between computer systems in a computer system network in accordance with one embodiment of the present invention. In this embodiment, computer systems 190*a* and 190*b* are client computer systems that are communicatively coupled via network 300 and network hardware 320 to a server computer system. The server computer system is fundamentally represented as coupled processor 330 and memory 340. The flow of data from computer system 190*a* is indicated by path 360. In accordance with the present invention, memory 340 (or a portion of memory 340) is exposed to one or more of the software elements (e.g., software element 195) executed by computer system 190*a*. That is, memory 340 (or a portion of memory 340) is allocated so that it can be used and accessed by computer system 190*a*, or software element 195 in particular. Thus, memory 340 can be directly accessed (e.g., read from or written to) by software element 195, bypassing processor 330.

Figure 4:
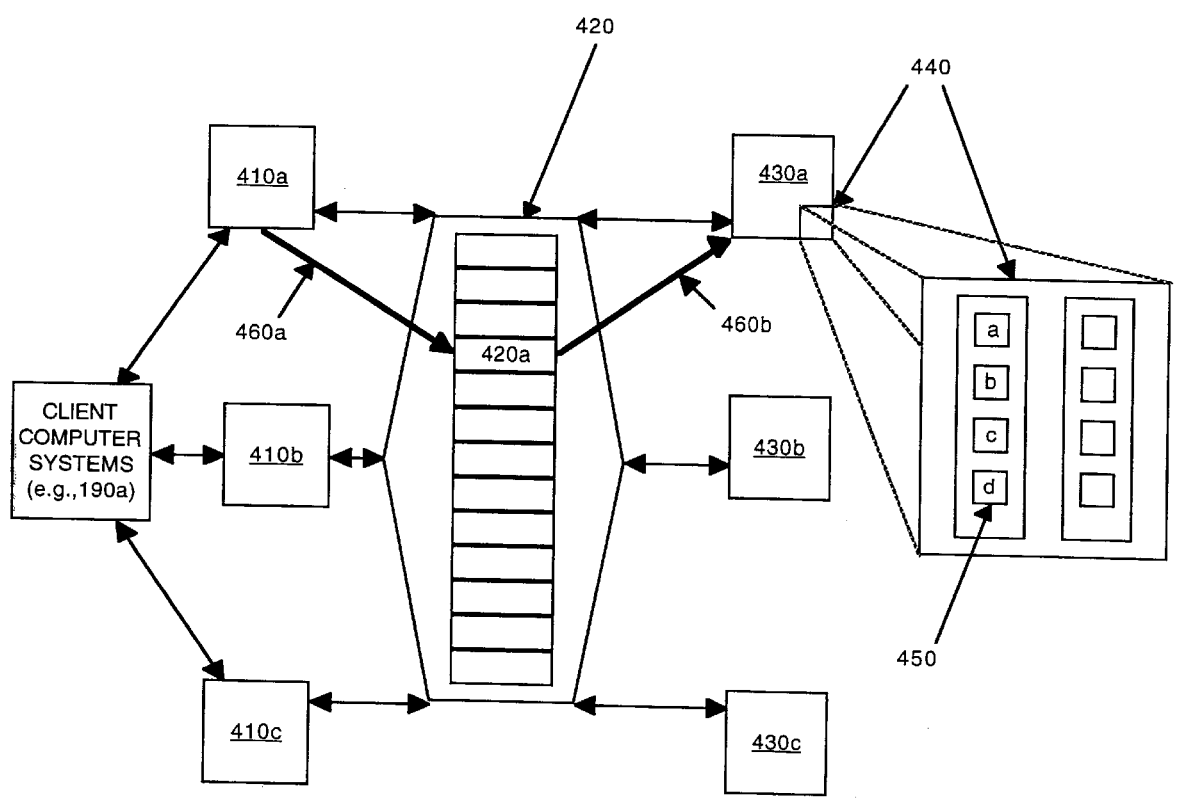
FIG. 4 is a block diagram showing the flow of data in a server computer system in accordance with one embodiment of the present invention.

FIG. 4 illustrates the flow of data in server computer system 400 (such as that of FIG. 3) in accordance with one embodiment of the present invention. Server computer system 400 is communicatively coupled to a plurality of client computer systems (e.g., computer systems 190*a* and 190*b* of FIG. 3) by network adapters 410*a*, 410*b* and 410*c* (also commonly referred to as network interface cards). It is appreciated that a different number of network adapters than that illustrated by FIG. 4 may be utilized in accordance with the present invention.

Network adapters 410*a*, 410*b* and 410*c* are coupled to network hardware 420 (e.g., a switch or a router or the like). Network hardware 420 in turn is coupled to a plurality of "back end" memory systems, such as a buffer system or a disk system or the like, represented by memory units 430*a*, 430*b* and 430*c*. It is appreciated that a different number of memory units than that illustrated by FIG. 4 may utilized in accordance with the present invention. Memory units 430*a*, 430*b* and 430*c* are shared memory units; that is, they can be directly accessed by a software element residing on a client computer system (e.g., software element 195 of FIG. 3) while bypassing the processor (not shown) of server computer system 400.

Thus, in accordance with the present invention, a message from a client computer system (e.g., computer system 190*a* of FIG. 3) will arrive at server computer 400 via a network adapter (e.g., network adapter 410*a*). The message will follow, for example, data paths 460*a* and 460*b* through one of the components of network hardware 420 (e.g., 420*a*) directly to shared memory unit 430*a* (for example). In accordance with the present invention, it is anticipated that the number of shared memory units 430*a*, 430*b* and 430*c* will be significantly less than the number of network adapters 410*a*, 410*b* and 410*c*.

Continuing with reference to FIG. 4, table 440 exemplifies a data structure (e.g., a lookup table) used to identify whether specific data of interest (e.g., a page) is resident in shared memory unit 430*a*, and what the address in memory is for that data. In one embodiment, table 440 resides in shared memory unit 430*a*. In another embodiment, table 440 resides in memory of network hardware 420*a*. In one embodiment, table 440 utilizes bit flags (450*a–d*) to indicate whether the data of interest are resident in shared memory 430*a*. In one embodiment, bit flags 450*a–d* are read by network adapter 410*a* to determine whether the data of interest are present in shared memory 430*a*. In another embodiment, bit flags 450*a–d* are stored in memory of network adapter 410*a*; in this case, the availability of the data of interest can be determined at network adapter 410*a* rather than through lookup table 440. Additional information is provided in conjunction with FIG. 6.

Figure 5A:
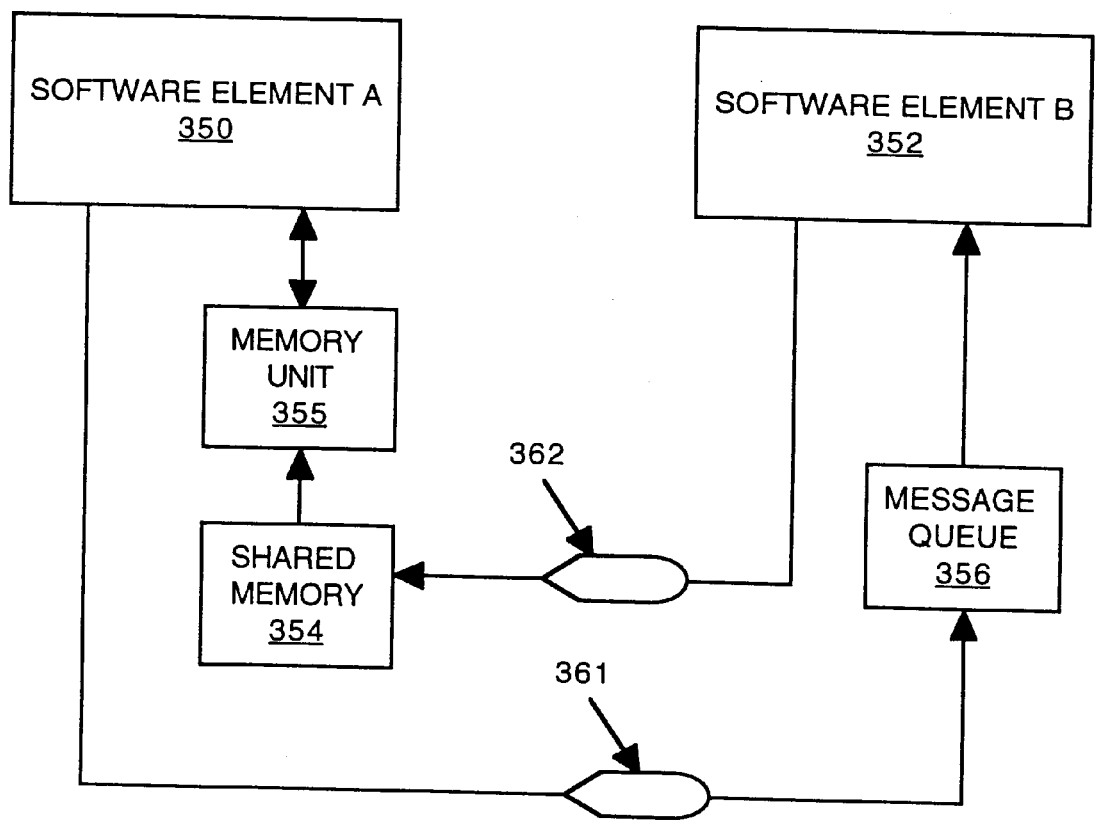
FIG. 5A is a block diagram of software elements in a computer system in accordance with one embodiment of the present invention.

FIG. 5A illustrates software elements A 350 and B 352 executed by computer system 190*a* in accordance with one embodiment of the present invention. It is appreciated that for simplicity only two software elements are shown; however, any number of software elements may be utilized in accordance with the present invention.

In the present embodiment of the present invention, computer system 190*a* includes shared memory unit 354 which is exposed to both software element A 350 and B 352. Shared memory unit 354 is a portion of the memory of computer system 190*a* (e.g., random access memory 102 of FIG. 2) that is allocated for use as described below in accordance with the present invention. In one embodiment of the present invention, shared memory unit 354 is accessed by software elements A 350 and B 352 using a direct memory access (DMA) operation.

In one embodiment of the present invention, computer system 190*a* also includes memory unit 355. In this embodiment, the contents of shared memory unit 354 are copied to memory unit 355 by computer system 190*a*. Thus, if shared memory unit 354 is written to by software element B 352, the previous contents of shared memory unit 354 are stored elsewhere and are not overwritten.

Continuing with reference to FIG. 5A, a source software element (e.g.,software element A 350) transmits message 361 to a target software element (e.g., software element B 352). Typically, message 361 is placed in message queue 356. Software element B 352 responds to message 361 in the form of acknowledgment 362.

Typically, a prescribed number of messages are sent by the source software element before acknowledgment 362 is sent; the prescribed number of messages is commonly referred to as the window size. For example, for a window size equal to ten (10), 10 messages may be sent from software element A 350 before acknowledgment 362 is required. Software element A 350 will not transmit any further messages until it receives acknowledgment 362. After receiving acknowledgment 362, the software element A 350 transmits the next group of 10 messages. In some implementations, the window size is varied using mechanisms known in the art; for example, the window size may be increased or decreased as a function of how much data traffic is flowing over the computer system bus (e.g., bus 100 of FIG. 2). The present invention may be utilized whether the window size is constant or variable.

In accordance with the present embodiment of the present invention, after the prescribed number of messages are received by software element B 352, acknowledgment 362 is written to shared memory unit 354 by computer system 190a using DMA. Thus, software element A 350 needs only to read shared memory unit 354 to determine if an acknowledgment has been received so that the next group of messages can be sent. Additional details are provided in conjunction with FIG. 7.

In one embodiment, acknowledgment 362 comprises a credit value corresponding to the window size. That is, acknowledgment 362 specifies a credit value that prescribes the number of messages that can be sent from software element A 350 before an acknowledgment is needed from software element B 352. In this embodiment, acknowledgment 362 specifying the credit value is written to shared memory unit 354 using DMA as described above. The credit value is copied from shared memory unit 354 to memory unit 355.

In accordance with the present embodiment of the present invention, for each message 361 sent by the source software element, the credit value in memory unit 355 is reduced by one. Software element A 350 continues to send messages until the credit value is zero. Software element B 352 then writes acknowledgment 362 to shared memory unit 354, thereby restoring the credit value to its initial value so that source software element A 350 can proceed to send the next group of messages. Additional details are provided in conjunction with FIG. 7.

Figure 5B:
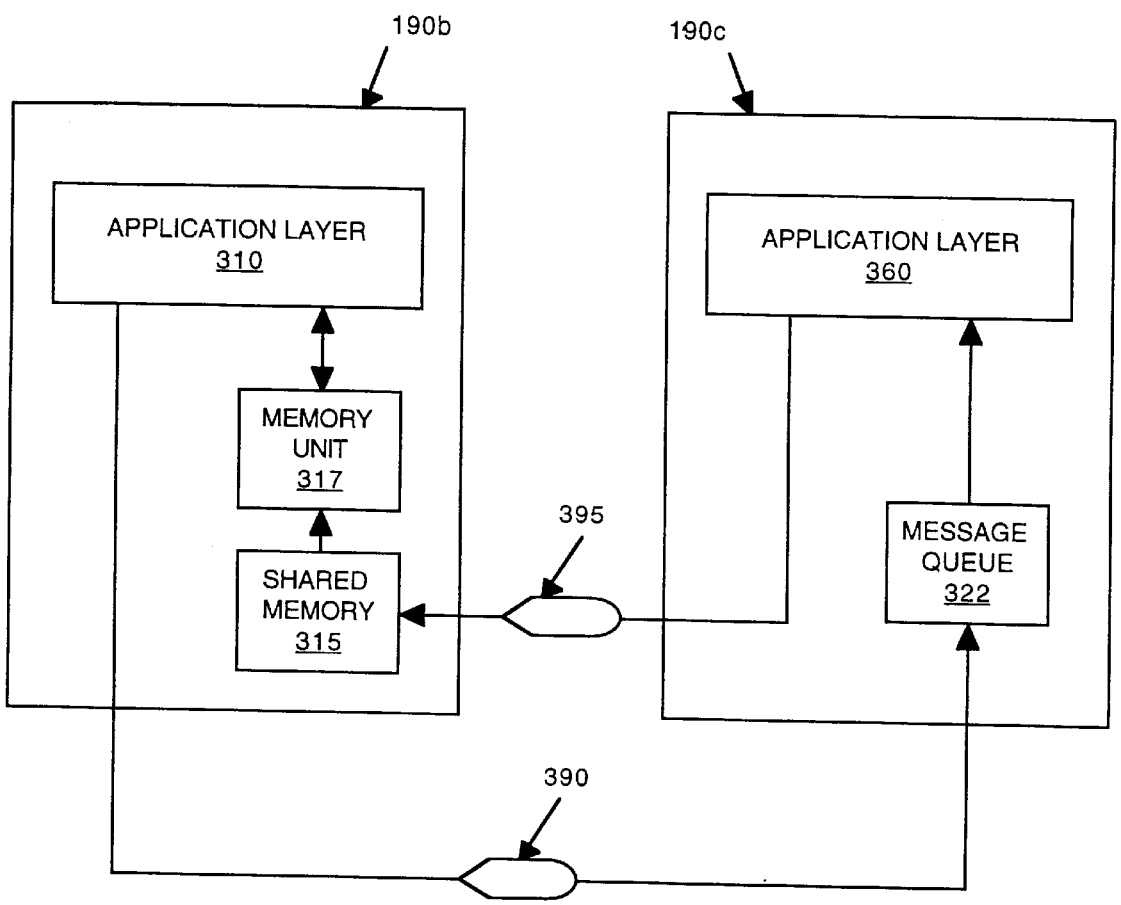
FIG. 5B is a block diagram of software elements in computer systems communicatively coupled in a computer system network in accordance with one embodiment of the present invention.

FIG. 5B illustrates software elements in computer system 190b and 190c communicatively coupled in computer system 530 network in accordance with one embodiment of the present invention. It is appreciated that for simplicity only two computer systems are shown; however, any number of computer systems may be utilized in accordance- with the present invention.

The software elements executed by computer system 190b are represented by application layer 310. Similarly, the software elements executed by computer system 190c are represented by application layer 360. The software elements executed by computer systems 190b and 190c include any of the various software elements known in the art, including for example software applications (e.g., word processors, database management systems, electronic mail and the like) and protocol stacks written in an operating system or device drivers.

In the present embodiment of the present invention, computer system 190b includes shared memory unit 315 which is exposed to both application layer 310 and application layer 360. Shared memory unit 315 is a portion of the memory of computer system 190b (e.g., random access memory 102 of FIG. 2) that is allocated for use as described below in accordance with the present invention. In accordance with one embodiment of the present invention, computer system 190c performs a DMA operation to access shared memory unit 315.

In one embodiment of the present invention, computer system 190b also includes memory unit 317. In this embodiment, the contents of shared memory unit 315 are copied to memory unit 317 by computer system 190b. Thus, if shared memory unit 315 is written to by computer system 190c, the previous contents of shared memory unit 315 are stored elsewhere and are not overwritten.

Continuing with reference to FIG. 5B, in accordance with the present invention, one of the software elements (e.g., a source software element from application layer 310) of computer system 190b transmits to computer system 190c a data packet (e.g., message 390) containing, for example, a command or request. Typically, message 390 is placed in message queue 322 of computer system 190c. Computer system 190c responds to message 390 in the form of acknowledgment 395. As described above in conjunction with FIG. 5A, typically a prescribed number of messages are sent by the source software element before acknowledgment 395 is sent.

In accordance with the present embodiment of the present invention, after the prescribed number of messages are received by the target software element in application layer 360, acknowledgment 395 is written to shared memory unit 315 by computer system 190c using DMA. Thus, the source software element in application layer 310 of computer system 190b needs only to read shared memory unit 315 to determine if an acknowledgment has been received so that the next group of messages can be sent. Additional details are provided in conjunction with FIG. 7.

In one embodiment, acknowledgment 395 comprises a credit value corresponding to the window size. That is, acknowledgment 395 specifies a credit value that prescribes the number of messages that can be sent from the source software element of computer system 190b before an acknowledgment is needed from computer system 190c. In this embodiment, acknowledgment 395 specifying the credit value is written to shared memory unit 315 using DMA as described above. The credit value is copied from shared memory unit 315 to memory unit 317. In accordance with the present embodiment of the present invention, for each message 390 sent by the source software element, the credit value in memory unit 317 is reduced by one. The source software element continues to send messages until the credit value is zero. The target software element then writes acknowledgment 395 to shared memory unit 315, thereby restoring the credit value to its initial value so that the source software element can proceed to send the next group of messages. Additional details are provided in conjunction with FIG. 7.

Figure 6:
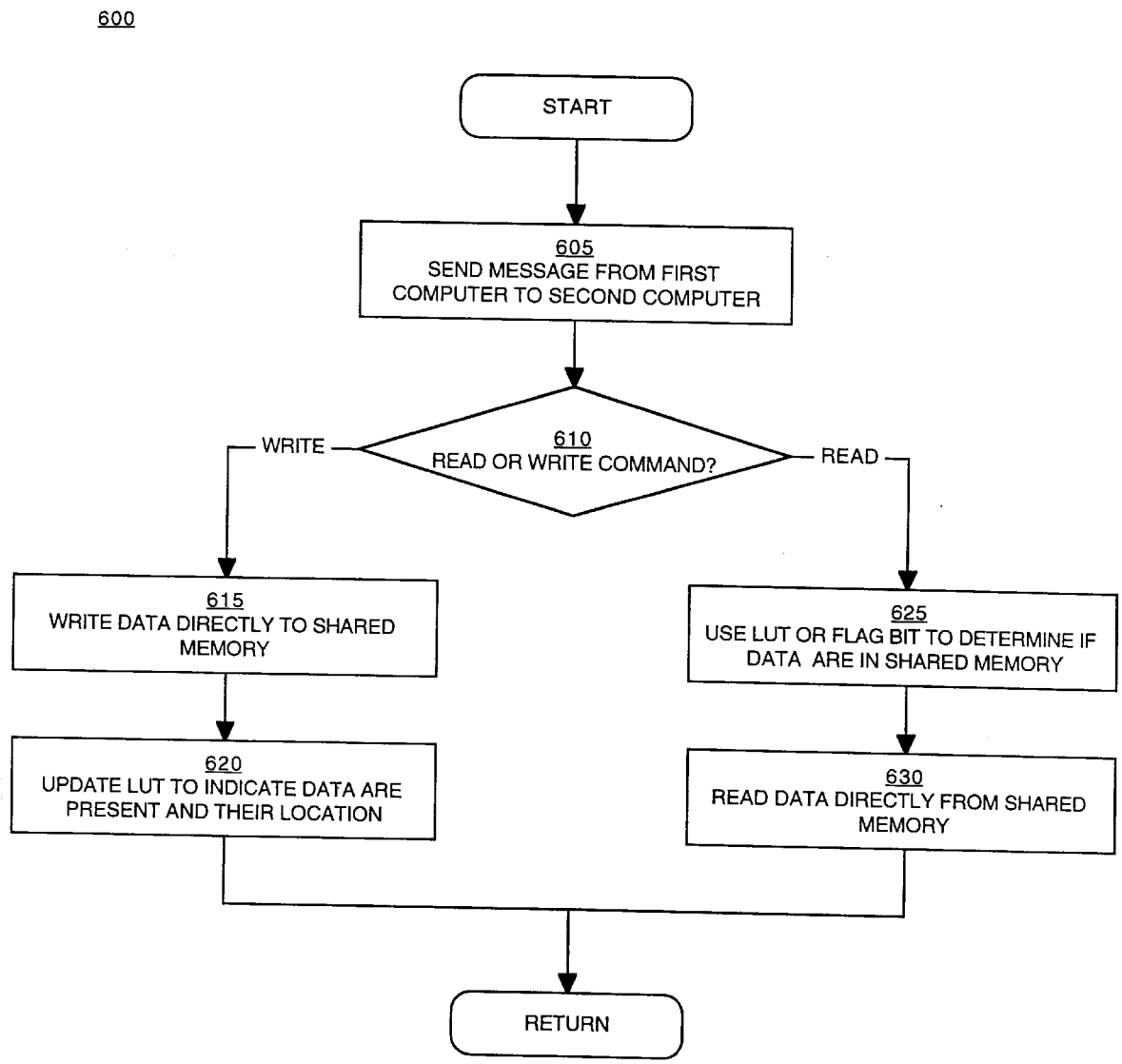
FIG. 6 is a flowchart of the steps in a process for exchanging messages between software elements in accordance with one embodiment of the present invention.

FIG. 6 is a flowchart of process 600 for exchanging messages between software elements in computer systems communicatively coupled in a computer system network in accordance with one embodiment of the present invention.

In step 605 of FIG. 6, with reference also to FIGS. 3 and 4, a message is sent from a client computer system (e.g., computer system 190a) to server computer system 400 over computer system network 300. The message can be either a read command or a write command (e.g., a get or a put) (step 610).

In step 615 of FIG. 6, if the message is a write command, the information specified in the message (e.g., digital data)

can be written directly to shared memory unit 430*a*. The message arrives at network adapter 410*a*, and follows the data path exemplified by 460*a* and 460*b* to shared memory unit 430*a*.

In step 620 of FIG. 6, table 440 is updated to include the memory location of the data written in shared memory unit 430*a*. A bit flag in table 440 is set to indicate the presence of these data. Thus, subsequent requests directed to these data can be accomplished by directly accessing shared memory unit 430*a* using the memory location from table 440. As described above, table 440 can reside in shared memory unit 430*a*, or alternatively can reside in memory of a switch or router or similar device (e.g., network hardware 420*a*).

In step 625 of FIG. 6, if the message is a read command, an assumption is made by client computer system 190*a* that the information of interest (e.g., a page of data) is present in shared memory unit 430*a*. In one embodiment, a bit flag (e.g., bit flag 450*d*) is used to indicate whether the page resides in shared memory unit 430*a*. In one embodiment, bit flag 450*d* resides in memory of network adapter 410*a*; in this embodiment, bit flag 450*d* can be read at network adapter 410*a*. In another embodiment, bit flag 450*d* resides in table 440, which in turn resides either in memory of network hardware 420*a* or in shared memory unit 430*a*.

In step 630, if the page resides in shared memory unit 430*a*, then the page can be directly accessed using the memory location in table 440 in accordance with the present invention; that is, processor 330 is bypassed. If the page of interest is not located in shared memory unit 430*a*, then processing of the read command proceeds in the typical fashion in order to retrieve it from the memory of server computer system 400.

Thus, the present embodiment of the present invention uses a shared memory unit (e.g., shared memory unit 430*a* of FIG. 4) residing on a server computer system that is exposed to a client computer system. The client computer system, specifically a software element residing on the client computer system (e.g., software element 195 of FIG. 3), can directly access and read/write data from/to shared memory unit 430*a*, bypassing processor 330 (FIG. 3). Thus, in accordance with the present embodiment of the present invention, it is not necessary to expend computer resources for message exchanges and data transmission when the information of interest resides in shared memory unit 430*a*. The present embodiment of the present invention thus provides a method that reduces the processing overhead associated with message exchange and data transmission. In addition, the exchange of data/messages can be accomplished at the memory transition rate instead of the software rate, which can reduce latency and thereby result in an overall improvement in the performance of a computer system as well as potential improvements to the overall performance of a computer system network.

Figure 7:
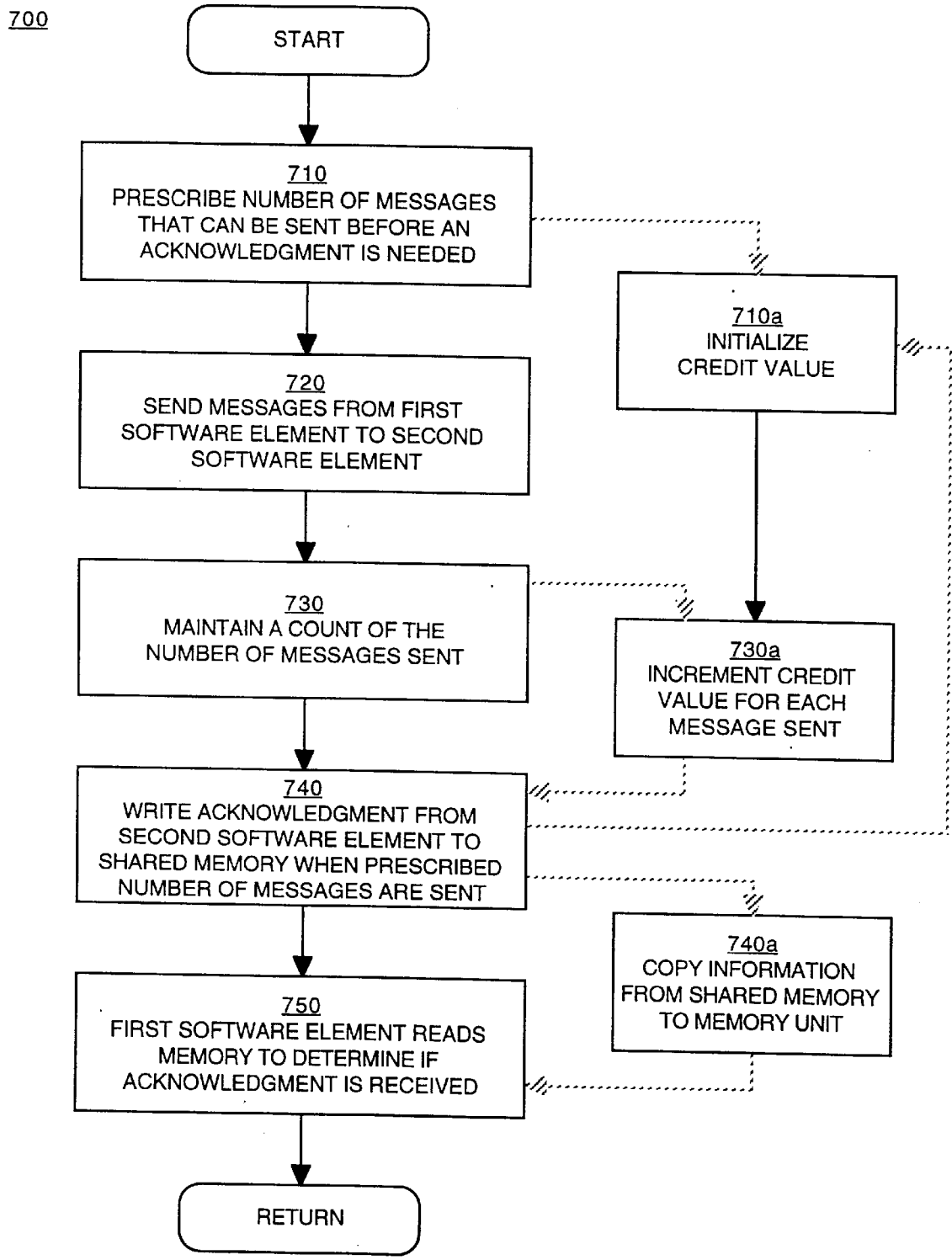
FIG. 7 is a flowchart of the steps in a process for acknowledging messages between software elements in accordance with one embodiment of the present invention.

FIG. 7 is a flowchart of process 700 for acknowledging messages sent from one software element to another software element in accordance with one embodiment of the present invention. In one embodiment, process 700 is implemented using computer-readable program instructions executed by processor 101 of FIG. 2.

In step 710 of FIG. 7, with reference also to FIGS. 5A and 5B, the number of messages (e.g., messages 361 and 390) that can be sent by the source software element (e.g., software element A 350 or a software element in application layer 310) before an acknowledgment (e.g., acknowledgments 362 and 395) is needed is prescribed using various known techniques for setting a window size. The prescribed number may be constant or it may vary. The prescribed number is initially stored in memory that is accessible by the source software element (e.g., memory unit 317 or 355, or shared memory 315 and 354).

In step 720, messages associated with a particular transaction are sent from the source software element to the target software element (e.g., software element B 352 or a software element in application layer 360).

In step 730, a count is maintained of the number of messages associated with the particular transaction of interest that are sent from the source software element to the target software element. The source software element reads the appropriate memory location (see step 710) to determine whether the number of messages sent is less than the prescribed value.

In step 740, when the number of messages sent is equal to the prescribed number from step 710, no further messages associated with the particular transaction of interest are sent from the source software element until an acknowledgment is received from the target software element. In accordance with the present invention, the acknowledgment is written to shared memory (e.g., shared memory 354 and 315 of FIGS. 5A and 5B, respectively). In one embodiment, the acknowledgment is written to shared memory using a DMA operation.

In one embodiment (step 740*a*), the credit value in shared memory 315 or 354 is copied to memory unit 317 or 355, respectively. Thus, when the information in shared memory is overwritten by an acknowledgment, the preceding information is preserved in memory unit 317 or 355.

In step 750, the source software element reads shared memory 315 or 354 to determine whether the acknowledgment is received. In the alternate embodiment, the source software element reads memory unit 317 or 355 to determine whether the acknowledgment is received. If so, the source software element can proceed with sending the next group of messages associated with the particular transaction.

In one embodiment (step 710*a*), the number of messages prescribed in step 710 is used to initialize a credit value in shared memory 315 or 354. The initial credit value is thus equal to the number of messages that may be sent from the source software element before an acknowledgment from the target software element is needed.

In this embodiment, in step 730*a*, the credit value from step 710*a* is changed incrementally for each message sent that is associated with a particular transaction. The source software element reads the credit value to determine whether messages can continue to be sent. When the credit value reaches a prescribed value, the source software element does not send any further messages until an acknowledgment is received from the target software element.

For example, the credit value could be set to an initial value of 10 and the prescribed value could be set to zero. For each message sent by the source software element for the particular transaction of interest, the credit value is incrementally reduced by one. When the prescribed value of zero is reached, an acknowledgment is required from the target software element. Similarly, the credit value could be set to 10 and the prescribed value set to 20, and the credit value could be incrementally increased by one for each message sent by the source software element until the value of 20 is reached. It is appreciated that any value for the initial credit value, the prescribed value, and the incremental value could be used in accordance with the present invention.

In accordance with the present embodiment of the present invention, the source software element then reads shared memory to determine that the acknowledgment has been received. In this embodiment, the acknowledgment restores the credit value in shared memory to its initial value (e.g., back to 10 according to the example above); however, as explained above, the credit value can be varied according to, for example, how busy the computer system or the network is. In this embodiment, the source software element reads the credit value and determines that the credit value is reset. For example, the source software element determines that the credit value is not zero and so can deduce that an acknowledgment was received.

Thus, the present embodiment of the present invention uses a shared memory that is exposed to both the source software element and the target software element. The target software element is thus able to write an acknowledgment to the shared memory, and the source software element is able to read the shared memory to determine if an acknowledgment is received. In one embodiment, the acknowledgment is used to reset a credit value. In this embodiment, the source software element reads the credit value to determine whether an acknowledgment is received. If, for example, the credit value is not equal to a prescribed value (e.g., zero), then the source software element can proceed with sending messages to the target software element. Thus, in accordance with the present embodiment of the present invention, it is not necessary to expend computer system resources in order to perform operations associated with processing acknowledgments. The present invention thus provides a method that reduces the processing overhead associated with flow control of acknowledgments that are sent by software elements in response to messages from other software elements. Consequently, the present invention frees up processing and memory resources for other operations. Hence, the present invention improves the overall performance of the computer system in this regard.

The preferred embodiment of the present invention, remote access using shared memory, is thus described. While the present invention has been described in particular embodiments, it should be appreciated that the present invention should not be construed as limited by such embodiments, but rather construed according to the following claims.

What is claimed is:

1. A method for exchanging messages between computer systems communicatively coupled in a computer system network, said method comprising the steps of:

generating a message from a software element of a first computer system;

placing said message by said software element of the first computer system in a location of a memory unit shared by said first computer system and a second computer system without receiving any memory allocation for the memory unit from the second computer system;

determining whether said message is destined for a software element of said second computer system;

retrieving said message from said location in said shared memory unit by said software element of said second computer system in response to said message being destined for said software element of said second computer system, said software element of said first computer system and said software element of said second computer system operable to directly access said shared memory unit for placement and retrieval of said message.

2. The method of claim 1, further comprising:

writing data to said shared memory unit in response to said message being a write command; and updating a lookup table to indicate a presence of said data in said shared memory unit and to identify a memory location of said data.

3. The method of claim 2, further comprising:

setting a bit flag to indicate a presence of said data in said shared memory unit.

4. The method of claim 3, wherein said bit flag is stored in a network adapter coupled to said second computer system.

5. The method of claim 4, further comprising:

receiving said message at said network adapter;

forwarding said message to a network hardware component coupled to said network adapter; and forwarding said message from said network hardware component to one of a plurality of shared memory units.

6. The method of claim 5, wherein said network hardware component is a switch.

7. The method of claim 5, wherein said network hardware component is a router.

8. The method of claim 3, wherein said bit flag is stored in said lookup table.

9. The method of claim 2, further comprising:

using said lookup table to determine whether data is in said shared memory unit in response to said message being a read command.

10. The method of claim 1, further comprising:

sending messages from said second software element to said first software element;

maintaining a count of a number of said messages sent by said second software element to said first software element; and writing an acknowledgment message from said first software element to said shared memory unit when said count reaches a prescribed number, said acknowledgment message from said first software element acknowledging receipt of said prescribed number of messages from said second software element.

11. The method of claim 10, further comprising:

initializing a credit value in said shared memory unit; and incrementing said credit value for each of said messages sent by said second software element.

12. The method of claim 11, further comprising:

writing said acknowledgment message from said first software element to said shared memory unit when said credit value reaches a prescribed value.

13. The method of claim 12, wherein said message sets said credit value to its initial value.

14. The method of claim 1, wherein said first computer system is a client computer system and said second computer system is a server computer system.

15. A method for acknowledging messages between a first software element and a second software element using a shared memory unit, said method comprising the steps of:

sending messages from said first software element to said shared memory unit and destined for said second software element without requiring any memory allocation control from said second software element;

maintaining a count of a number of messages sent by said first software element to said shared memory unit;

retrieving messages from said shared memory unit by said second software element writing an acknowledgment message from said second software element to said shared memory unit directly accessible by said first software element and by said second software element when said count reaches a prescribed number, said acknowledgment message from said second software element acknowledging retrieval of said prescribed number of messages from said shared memory unit generated by said first software element;

retrieving said acknowledgment message from said shared memory unit by said first software element.

16. The method of claim 15, further comprising:

initializing a credit value in said shared memory unit; and incrementing said credit value for each of said messages sent by said first software element.

17. The method of claim 16, further comprising:

writing said acknowledgment message from said second software element to said shared memory unit when said credit value reaches a prescribed value.

18. The method of claim 17, wherein said acknowledgment message sets said credit value to its initial value.

19. The method of claim 15, wherein said first software element and said second software element reside in a single computer system.

20. The method of claim 15, wherein said first software element and said second software element reside in different computer systems communicatively coupled in a computer system network.

21. The method of claim 15, wherein writing said acknowledgment message includes a direct memory access (DMA) operation.

22. The method of claim 15, further comprising:

copying said acknowledgment message written by said second software element from said shared memory unit to a second memory unit.

* * * * *